United States Patent [19]

Meyer et al.

[11] 4,205,159
[45] May 27, 1980

[54] TRANSPARENT POLYAMIDES FROM PACM AND A MIXTURE OF DICARBOXYLIC ACIDS

[75] Inventors: Rolf-Volker Meyer; Rolf Dhein; Friedrich Fahnler, all of Krefeld, Fed. Rep. of Germany

[73] Assignee: Bayer Akteingesellschaft, Fed. Rep. of Germany

[21] Appl. No.: 925,409

[22] Filed: Jul. 17, 1978

[30] Foreign Application Priority Data

Jul. 21, 1977 [DE] Fed. Rep. of Germany ....... 2732928

[51] Int. Cl.$^2$ .............................................. C08G 69/26
[52] U.S. Cl. .............................. 528/338; 260/33.4 R; 528/336; 528/339; 528/340; 528/346; 528/347
[58] Field of Search ............... 528/346, 338, 339, 340

[56] References Cited

U.S. PATENT DOCUMENTS

| | | | |
|---|---|---|---|
| 3,840,501 | 10/1974 | Shue et al. | 528/346 |
| 3,842,045 | 10/1974 | Campbell | 528/346 |

FOREIGN PATENT DOCUMENTS 1193487  6/1970  United Kingdom .

*Primary Examiner*—Harold D. Anderson
*Attorney, Agent, or Firm*—Connolly and Hutz

[57] ABSTRACT

A transparent polyamide which is the polycondensation product of bis-(4-aminocyclohexyl)-methane and a mixture of azelaic acid and at least one acid selected from group consisting of isophthalic acid and adipic acid. Up to 30 mol % of said bis-(4-aminocyclohexyl)-methane may also be replaced with hexamethylene diamine or another $C_8$–$C_{15}$ cycloaliphatic diamine. Said transparent polyamide is useful for the production of sheets, films, plates, tubes, rods and containers of various types by extruding or molding.

4 Claims, No Drawings

TRANSPARENT POLYAMIDES FROM PACM AND A MIXTURE OF DICARBOXYLIC ACIDS

This invention relates to transparent, thermoplastic copolyamides which have a high dimensional stability under heating.

The present invention relates in particular to polyamides which are prepared by the poly-condensation of bis-(4-amino-cyclohexyl)-methane and optionally minor quantities of aliphatic and/or other cycloaliphatic diamines as the diamine component with mixtures of azelaic acid and isophthalic acid or adipic acid as the dicarboxylic acid component.

The well known advantageous combination of properties found in the usual polyamides such as 6-polyamide or 6,6-polyamide makes these substances highly preferable to other thermoplastically processable materials in many fields of application. However, due to the partial crystallinity of these polyamides shaped products produced from these polyamides are invariably opaque. Thus, these polyamides are unsuitable wherever transparent shaped products are required.

There has therefore been no lack of attempts to produce polyamides which would be amorphous and therefore transparent as well as having the advantageous properties of polyamide-6 or polyamide-6,6.

One of these attempts is the use of bis-(4-aminocyclohexyl)-methane for the preparation of polyamides. Transparent polyamides obtained from this diamine and aromatic dicarboxylic acids such as isophthalic acid (U.S. Pat. No. 2,696,482) or terephthalic acid (U.S. Pat. No. 2,516,585) are already known, but these products are difficult to process thermoplastically on account of their high melt viscosity.

Attempts have also been made to produce transparent polyamides from bis-(4-aminocyclohexyl)-methane and other polyamide-forming components such as adipic acid, hexamethylenediamine and ε-caprolactam, but these polyamides are highly unstable to solvents and become cloudy due to the formation of spheroliths.

The polyamides described in German Offenlegungsschrift No. 1,595,354 (=GB-PS 1193487) and based on bis-(4-amino-cyclohexyl)propane and adipic acid have less tendency to crystallise, but their thermoplastic process is poor because of their high softening points.

Lower melting polyamides obtained from bis-(4-aminocyclohexyl)-methane and aliphatic dicarboxylic acids such as adipic acid (U.S. Pat. No. 2,585,163) are either opaque or tend to become cloudy due to subsequent crystallisation.

Transparent polyamides have been described in German Offenlegungsschrift No. 1 933 395 (=U.S. Pat. No. 3,597,400). The polyamides contain bis-(4-aminocyclohexyl)-methane and hexamethylene diamine as the diamine components and isophthalic acid and terephthalic acid as the dicarboxylic acids in strictly defined proportions.

One particular disadvantage of these polyamides is that the proportion of bis-(4-aminocyclohexyl)-methane, which considerably improves the dimensional stability of the polyamide should not be more than 50 mol %, i.e. at the most ca. 65% by weight of the diamines. Products containing a higher proportion of bis-(4-aminocyclohexyl)-methane have an excessively high melt viscosity so that they can no longer be shaped by the usual injection moulding processes.

The high proportion of hexamethylene diamine which is an essential feature of these polyamides causes the products to have an insufficient high dimensional stability under heating.

Copolyamides of bis-(4-aminocyclohexyl)-methane and 3-ethyl-1,10-decane dicarboxylic acid have been described in German Offenlegungsschrift No. 2,125,906 (=U.S. Pat. No. 3,808,181). Although the transparent products obtained are easily processed, the long and branched carbon chain of the dicarboxylic acid causes them to have a dimensional stability under heating of only 130° C., which is insufficient. Moreover, 3-ethyl-1,10-decane dicarboxylic acid, an essential component of these copolyamides, is difficult to obtain.

Lastly, in German Offenlegungsschrift No. 2,642,244 there have been disclosed transparent polyamides obtained from bis-(4-aminocyclohexyl)-methanes, isophthalic acid and inter alia salts of aliphatic dicarboxylic acids and aliphatic diamines, in which the average number of methylene groups for each amide group is at least 9. These polyamides have insufficient dimensional stability under heating, presumably due to the long chain components, and their transparency is not sufficiently stable in boiling water.

The transparent polyamides hitherto proposed thus have disadvantages in their chemical resistance, softening temperature and deformability in the molten state.

It has now surprisingly been found that copolyamides of bis-(4-aminocyclohexyl)-methane and optionally minor quantities of an aliphatic and/or another cycloaliphatic diamine and a mixture of azelaic acid and isophthalic acid or of azelaic acid and adipic acid do not have the disadvantages mentioned above if the proportion of isophthalic acid or adipic acid used is kept within certain limits.

Thus in spite of the very high proportion of bis-(4-aminocyclohexyl)-methane, the copolyamides can be processed without difficulty into thermoplastic shaped products which are characterised by toughness, high dimensional stability under heating and good stability to organic solvents.

This invention therefore relates to transparent, thermoplastically processable copolyamides which have a relative viscosity of at least 2.2 (determined in a 1% solution of the polyamide in m-cresol at 25° C.), obtained by the polycondensation of 1. from 70 to 100 mol %, preferably from 80 to 100 mol %, of bis-(4-aminocyclohexyl)-methane;

2. from 0 to 30 mol %, preferably from 0 to 20 mol %, of hexamethylene diamine and/or a $C_8$–$C_{15}$-cycloaliphatic diamine other than bis-(4-aminocyclohexyl)-methane, such that the molar ratio of all the cycloaliphatic diamines from 1. and 2. to hexamethylenediamine is at least 4:1, preferably at least 5:1 and the sum of 1. and 2. is always 100 mol %; and 3. equivalent quantities of a dicarboxylic acid mixture consisting of:
   (a) from 50 to 90 mol %, preferably from 70 to 85 mol % of azelaic acid and from 10 to 50 mol %, preferably from 30 to 15 mol % of isophthalic acid or
   (b) from 60 to 90 mol %, preferably from 70 to 85 mol % of azelaic acid and from 10 to 40 mol %, preferably from 15 to 30 mol % of adipic acid such that components (a) and components (b), respectively, add up to 100 mol %.

Copolyamides which have been prepared by the polycondensation of from 85 to 70 mol % of azelaic acid and from 15 to 30 mol % of isophthalic acid or adipic acid and bis-(4-aminocyclohexyl)-methane as the only diamine component are particularly preferred. As from bis-(4-aminocyclohexyl)-methane different cycloaliphatic diamines especially isophorone diamine can be used.

Bis-(4-aminocyclohexyl)-methane is a stereo-isomeric mixture consisting predominantly of trans, trans and cis, trans isomers and to a smaller extent of cis,cis isomers. The stereoisomeric mixture melting above 30° C. which is obtained from hydrogenation of bis-(4-aminophenyl)-methane is used for the condensation reaction.

The copolyamides are prepared by the conventional methods used for the preparation of polyamides from diamines and dicarboxylic acids. The mixture of starting components may be heated to a temperature of from 190° to 230° C. and may be precondensed at this temperature range. After termination of the precondensation reaction, polycondensation is continued to completion at a temperature of from 240° to 300° C.

The condensation reaction may be carried out under a vacuum towards the end of polymerisation, but this is by no means essential.

The precondensation reaction may be carried out with or without the addition of water and at atmospheric pressure or inside a sealed autoclave under the vapour pressure of water.

The condensation is preferably carried out in a sealed autoclave in the presence of from 10 to 20% by weight of water. It is not necessary to begin the polycondensation reaction using salts of the monomers, especially if the precondensation is carried out in the presence of water.

The loss of diamine which occurs during the polycondensation reaction is preferably compensated by adding a suitable excess of bis-(4-aminocyclohexyl)-methane.

The molecular weight of the polyamides may be regulated by the addition of monocarboxylic acids or amines in known manner.

The relative viscosity of the copolyamides according to the present invention should be at least 2.2, and preferably from 2.4 to 3.5, determined on a 1% solution of the polyamide in m-cresol at 25° C. in an Ubbelohde viscosimeter.

Various additives used for conventional polyamides may be added to the polyamides according to the present invention, e.g. flame retardants, heat stabilizers, UV stabilizers, antioxidants and pigments. These substances may be added at any desired stage before or after polymerisation as in known amounts.

The polyamides according to the present invention have excellent transparency, chemical resistance, thermal stability and deformability in the molten state and are valuable moulding compounds for the manufacture of various extruded and moulded articles such as sheets, films, plates, tubes, rods and containers of various types.

EXAMPLE 1

3.76 kg (20 mol) of azelaic acid, 0.83 kg (5 mol) of isophthalic acid, 5.25 kg (25 mol) of bis-(4-aminocyclohexyl)-methane and 2 l of water are introduced into an autoclave. 40 g of benzoic acid are added to stabilize the molecular weight of the polyamide and 50 g of bis-(4-aminocyclohexyl)methane are added to compensate for diamine losses occurring during the polycondensation reaction.

The contents of the autoclave are heated to ca. 200° C. under a nitrogen atmosphere. The stirrer is switched on at 100° C. and the reaction mixture is maintained under its own pressure for 4 hours. The pressure is then slowly released, the temperature is raised to 270° C., and polycondensation is continued for a further 7 hours at 270° C.

The almost colourless polyamide obtained ($\eta_{rel}$2.7) is spun through a waterbath, granulated and dried.

Standard test rods are found to have a dimensional stability according to DIN (Deutsche Industrie Norm) 53 460 of 176° C. (tested according to Vicat, Method B); a notched impact strength according to DIN 53 453 of 5.9 kJ (kilo Joule)/m$^2$; and a flexural strength (DIN 53 452) of 110 mPa (milli Pascal). When the rods were tested for their impact strength (DIN 53 453), ten samples did not break.

EXAMPLES 2-6

The experiments were carred out by the method described in Example 1 and using quantities of the reactiants of the same order.

The composition of the monomers used as the starting materials and the various properties of the polyamides obtained are summarized in Table 1 which also shows the relative quantities of the starting materials in mol %.

COMPARISON EXPERIMENT A

A transparent copolyamide was prepared using 1.69 kg (9 mol) of azelaic acid, 1.49 kg (9 mol) of isophthalic acid and 3.82 kg (18 mol+40 g excess) of bis-(4-aminocyclohexyl)-methane by the method described in Example 1.

The resulting polyamide had a relative viscosity of 2.3 and a dimensional stability under heating of 193° C. but processing in injection moulding machines proved to be so difficult that the product must be regarded as unsuitable for practical purposes.

Table 1

| | Composition of starting monomers (mol %) | | | | Properties of the polyamides | | | |
|---|---|---|---|---|---|---|---|---|
| Example No. | Azelaic acid | Isophthalic acid | Adipic acid | Diamine* | $\eta$rel | Dimensional Stability (Vicat) °C. | Impact strength | Notched Impact strength (kJ/m$^2$) |
| 1 | 80 | 20 | — | 100 | 2.8 | 176 | u.b. | 6.2 |
| 2 | 70 | 30 | — | 100 | 2.6 | 159 | u.b. | 4.2 |
| 3 | 70 | 15 | 15 | 100 | 3.0 | 150 | u.b. | 4.5 |
| 4 | 90 | — | 10 | 100 | 3.3 | 164 | 95 kJ/m$^2$ | 5.0 |
| 5 | 80 | — | 20 | 100 | 3.0 | 159 | u.b. | 4.4 |
| 6 | 70 | — | 30 | 100 | 3.4 | 153 | u.b. | 4.5 |

*Bis-(4-aminocyclohexyl)-methane
u.b. = unbroken

Table 2

| Comparison experiment | Composition of the starting monomers (mol%) | | | | | $\eta rel$ | Remarks about the product |
|---|---|---|---|---|---|---|---|
| | Azelaic acid | Isophthalic acid | Adipic acid | Diamine * | ** | | |
| A | 50 | 50 | — | 100 | | 2.3 | cannot be processes; Dimensional stability (Vicat) = 193° C. |
| B | 30 | 70 | — | 100 | | 2.0 | brittle, MV too high |
| C | 30 | 35 | 35 | 100 | | 2.6 | little transparency, MV too high |
| D | 50 | — | 50 | 100 | | n.s. | high melting, low viscosity components, |
| E | — | 20 | 80 | 100 | | n.s. | MV too high |
| F | 100 | — | — | 100 | | 2.7 | not transparent, high MV |
| G | 60 | — | 40 | 80 | 20 | 3.5 | Dimensional stability (Vicat) = 113° C. |
| H | 60 | — | 40 | 70 | 30 | 3.3 | Dimensional stability (Vicat) = 105° C. |
| I | 100 | — | — | 80 | 20 | 2.2 | Dimensional stability (Vicat) = 120° C., not transparent |

*Bis-4-(amino  
**Hexamethylenediamine  
MV melt viscosity  
n.s. = not suitable

EXAMPLE 7

A polyamide is prepared by the method described in Example 1 using 3.76 kg (20 mol) of azelaic acid, 0.73 kg (5 mol) of adipic acid, 4.72 kg (22.5 mol) of bis-(4-aminocyclohexyl)-methane and 0.29 kg (2.5 mol) of hexamethylene diamine.

The polyamide obtained, which has a faint yellowish tinge, has a relative viscosity of 3.0, a dimensional stability under heating of 145° C., an impact strength of 82.4 kJ/m² (8 samples did not break) and a notched impact strength of 4.8 kJ/m².

COMPARISON EXPERIMENTS B–I

These experiments were carried out on a 100 g scale.

The monomers used as the starting materials were weighed out in specific proportions (see Table 2 for the molar ratios) and the reaction mixture was slowly heated to 200° C. under a nitrogen atmosphere with stirring. Heating was then continued to 270° C. and the polycondensation reaction was carried out for a further 6 hours at 270° C.

As can be seen from the remarks on the experimental results given in Table 2, it was impossible to complete polycondensation in some cases due to the high melting points of low molecular weight constituents.

We claim:

1. A transparent thermoplastic polyamide which is the polycondensation product of
   (1) from 70 to 100 mol % of bis-(4-aminocyclohexyl)methane;
   (2) 0 to 30 mol % of at least one member selected from the group consisting of hexamethylene diamine and $C_8$–$C_{15}$ cycloaliphatic diamines other than bis-(4-aminocyclohexyl)-methane, the molar ratio of the total cycloaliphatic diamines in (1) and (2) to hexamethylene diamine being at least 4:1 and the sum of (1) and (2) being 100 mol %, and
   (3) an equivalent quantity of a dicarboxylic acid mixture consisting of
      (a) from 70 to 85 mol % of azelaic acid and
      (b) from 30 to 15 mol % of at least one member selected from the group consisting of isophthalic acid and adipic acid, the sum of (a) and (b) being 100 mol %.
2. A polyamide of claim 1 wherein (1) is from 80 to 100 mol % of bis-(4-aminocyclohexyl)-methane and (2) is from 0 to 20 mol % of at least one compound selected from the group consisting of hexamethylene diamine and $C_8$–$C_{15}$ cycloaliphatic diamines other than bis-(4-aminocyclohexyl)-methane.
3. A polyamide of claim 1 wherein (1) is 100 mol % bis-(4-aminocyclohexyl)-methane.
4. A molded article prepared from a polyamide of claim 1.

* * * * *